United States Patent [19]
Naoe et al.

[11] Patent Number: 5,480,716
[45] Date of Patent: Jan. 2, 1996

[54] MAGNETIC RECORDING MEDIUM COMPRISING FERROMAGNETIC PARTICLES AND A COMPOUND WITH A PYRIMIDINE OR TETRAZAINDENE STRUCTURE

[75] Inventors: Koji Naoe; Kiyomi Ejiri, both of Kanagawa, Japan

[73] Assignee: Fuji Photo Film Co., Ltd., Kanagawa, Japan

[21] Appl. No.: 262,843

[22] Filed: Jun. 21, 1994

[30] Foreign Application Priority Data

Jun. 21, 1993 [JP] Japan ................... 5-172048

[51] Int. Cl.$^6$ .................................. G11B 5/00
[52] U.S. Cl. ............... 428/328; 428/403; 428/694 BA; 428/340; 428/900
[58] Field of Search ..................... 428/328, 403, 428/694 BA, 340, 900

[56] References Cited

U.S. PATENT DOCUMENTS

| | | | |
|---|---|---|---|
| 4,329,239 | 5/1982 | Chou | 252/51.5 A |
| 4,735,848 | 4/1988 | Kondo et al. | 428/219 |
| 4,937,098 | 6/1990 | Nishikawa et al. | 427/132 |
| 4,988,562 | 1/1991 | Ryoke et al. | 428/323 |
| 5,176,955 | 1/1993 | Ejiri et al. | 428/336 |
| 5,242,752 | 9/1993 | Isobe et al. | 428/329 |

FOREIGN PATENT DOCUMENTS

61-223070  10/1986  Japan .

*Primary Examiner*—Stevan A. Resan
*Attorney, Agent, or Firm*—Sughrue, Mion, Zinn, Macpeak & Seas

[57] ABSTRACT

A magnetic recording medium is disclosed which includes a magnetic layer containing ferromagnetic metal particles containing Al in an amount of 0.5 to 6% by weight per the total weight of metal components contained in the ferromagnetic metal particles, the ferromagnetic metal particles having the surfaces thereof coated with a compound or compounds of formula (1) or (2), as described herein. The magnetic recording medium has reduced abrasion with respect to magnetic heads and does not cause magnetic head fouling even under low humidity conditions.

4 Claims, 2 Drawing Sheets

MAGNETIC RECORDING MEDIUM COMPRISING FERROMAGNETIC PARTICLES AND A COMPOUND WITH A PYRIMIDINE OR TETRAZAINDENE STRUCTURE

FIELD OF THE INVENTION

The present invention relates to a magnetic recording medium. More particularly, it relates to a magnetic recording medium having excellent electromagnetic characteristics.

BACKGROUND OF THE INVENTION

Magnetic recording media are widely used as sound-recording tapes, video tapes, computer tapes, disks, etc. In such magnetic recording media, recording densities are becoming higher and recording wavelengths are becoming shorter, and in addition to an analogue recording mode, a digital recording mode is being investigated. Although efforts are being made to attain higher output and lower noise in the trend toward higher densities and shorter recording wavelengths, these are mainly based on improvements in the magnetic property of ferromagnetic metal particles having excellent magnetic properties. Specifically, higher coercive forces are achieved by reducing the particle size of ferromagnetic metal particles or narrowing the particle size distribution, while higher saturated magnetic flux densities are achieved by adding a slight amount of a metallic element such as Co or Ni.

Reduction of the particle size in ferromagnetic metal particles and addition of a metallic element such as Co or Ni, enhance the oxidizability inherent in ferromagnetic particles, that is, they are disadvantageous in that the magnetic properties deteriorate over time.

Conventionally, the surfaces of metal particles have been gradually oxidized to form an oxide film in order to prevent oxidation over time. However, if the oxide film is made thicker by, for example, treatment with a peroxide, as described in JP-A-56-30707, so as to improve oxidative stability, this results in impaired magnetic properties, in particular, reduced saturated magnetic flux density, which detracts from the superiority of metal particles. (The term "JP-A" as used herein means an "unexamined published Japanese patent application.")

Treating the surfaces of metal particles with a silane coupling agent, silicone oil, or the like, to make the surfaces hydrophobic is disclosed in, e.g., JP-A-52-155398, JP-A-53-5798, and JP-A-56-169304. However, this technique is disadvantageous in that the surfaces become so lipophilic that the particles have poor dispersibility.

Further, JP-A-61-223064, JP-A-61-223065, JP-A-61-2203066, JP-A-61-223067, JP-A-61-223068, JP-A-61-223069, and JP-A-61-223070 disclose surface treatment with a 2-thiouracil derivative, thiosalicylic acid, dithiouracil, 6-mercaptopurine, 2-mercaptobenzothiazole, and 6-amino-2-thiouracil, respectively. In addition, JP-A-4-6619 discloses an azimino compound (a compound having —NH—N=N— in a cyclic structure), a quinone, naphthol, and an oxime, JP-A-4-6617 discloses a hydroxylated compound having a cyclohexane framework (skeleton), and JP-A-3-292617 discloses use of dihydroxynaphthalene or a derivative thereof; these compounds are regarded as the newest and most improved surface-treating agents for eliminating the problems described above.

In magnetic recording media employing ferromagnetic metal particles the magnetic layer may have insufficient head-touching properties and, hence, when the magnetic layer is run on a magnetic head at a low speed, the surface of the magnetic head may be fouled during running, resulting in decreased output. This magnetic-head fouling is sometimes called seizing because it is a phenomenon similar to metal seizing. This problem has been severe, especially under low-humidity conditions. The compounds disclosed in the prior art references cited above are mainly intended to improve dispersibility of magnetic particles. Often, adhesive debris from the magnetic layer deposit on the magnetic head to cause head fouling or fill-up gaps in the magnetic head to cause head clogging and thereby impair electromagnetic characteristics. However, the prior art contains no descriptions therein concerning the effect of preventing these problems.

The incorporation of an abrasive material into a magnetic layer for the purpose of diminishing clogging and head fouling may cause excessive head abrasion which considerably decreases output to a degree which may be unacceptable in practical use.

A technique for adhering a metal, such as Cr, Mn, or Zn, or a metal oxide thereof, to ferromagnetic metal particles so as to improve oxidative stability is disclosed in, e.g., JP-A-50-41097, JP-A-51-112465, JP-A-49-41899 and JP-B-44-27942. (The term "JP-B" as used herein means an "examined Japanese patent publication.") However, this technique is disadvantageous in that surface properties are changed and this may result in poor dispersibility and impaired magnetic properties.

In order to eliminate problems concerning oxidative stability and dispersibility, and to impart abrading properties to a magnetic layer, Al or a compound thereof has been adhered to ferromagnetic metal particles, as disclosed in JP-B-63-22366, JP-A-63-103423 (combination with a polar-group binder), and JP-A-63-103424 (combination with a specific abrasive material). However, while increasing the amount of Al present on the ferromagnetic metal particles enhances the abrading properties of the tape, which eliminates the problem of head fouling, it may cause increased head abrasion.

To sum up, the prior art techniques described above have failed to satisfy the contradictory requirements for reducing head abrasion and preventing head fouling.

Consequently, there is a desire for a magnetic recording medium in which surface-treated ferromagnetic metal particles having increased oxidative stability are excellently dispersed in a binder resin, the particles having reduced abrasion with respect to magnetic heads and no magnetic-head fouling even under low-humidity conditions.

SUMMARY OF THE INVENTION

The present invention has been completed in view of the problems of the prior art techniques described above. An object of the present invention is to provide a magnetic recording medium suitable for high-density recording, which the medium employs ferromagnetic metal particles with excellent oxidative stability and good dispersibility in a binder resin and which has reduced abrasion with respect to magnetic heads and which does not cause magnetic-head fouling even under low-humidity conditions.

The foregoing object and other objects of the present invention are accomplished with a magnetic recording medium comprising a nonmagnetic support and a magnetic layer provided thereon, the magnetic layer comprising mainly ferromagnetic metal particles and a binder resin, said ferromagnetic metal particles containing Al in an amount of from 0.5 to 6% by weight per the total weight of metal components contained in the ferromagnetic metal particles and further containing on the surfaces thereof at least one compound selected from the group consisting of: a compound represented by the following formula (1) or a compound represented by the following formula (2):

wherein $R^1$ and $R^2$ each represents H, a substituted or unsubstituted alkyl or a substituted or unsubstituted aryl group, provided that at least one of $R^1$ and $R^2$ is a substituted or unsubstituted alkyl or aryl group;

wherein $R^3$ and $R^4$ each represents an —OH group, a substituted or unsubstituted alkyl or a substituted or unsubstituted aryl group, provided that at least one of $R^3$ and $R^4$ is a substituted or unsubstituted alkyl or aromatic group.

DETAILED DESCRIPTION OF THE INVENTION

The magnetic recording medium of this invention is characterized in that the ferromagnetic metal particles employed contain Al and that the surfaces of the ferromagnetic metal particles have been treated with a compound represented by formula (1) or (2), so that the surfaces contain the compound. Due to the above, the magnetic recording medium obtained has reduced head abrasion wear and head fouling and, hence, it causes only a slight decrease in output. Hereinafter, the compound represented by formula (1) and the compound represented by formula (2) are referred to also as "Compound 1 of this invention" and "Compound 2 of this invention," respectively, and either or both of the two are also referred to as "the compound(s) of this invention." In the magnetic recording medium of the present invention, both the Compounds 1 and 2 of this invention may be used.

Figure 1:
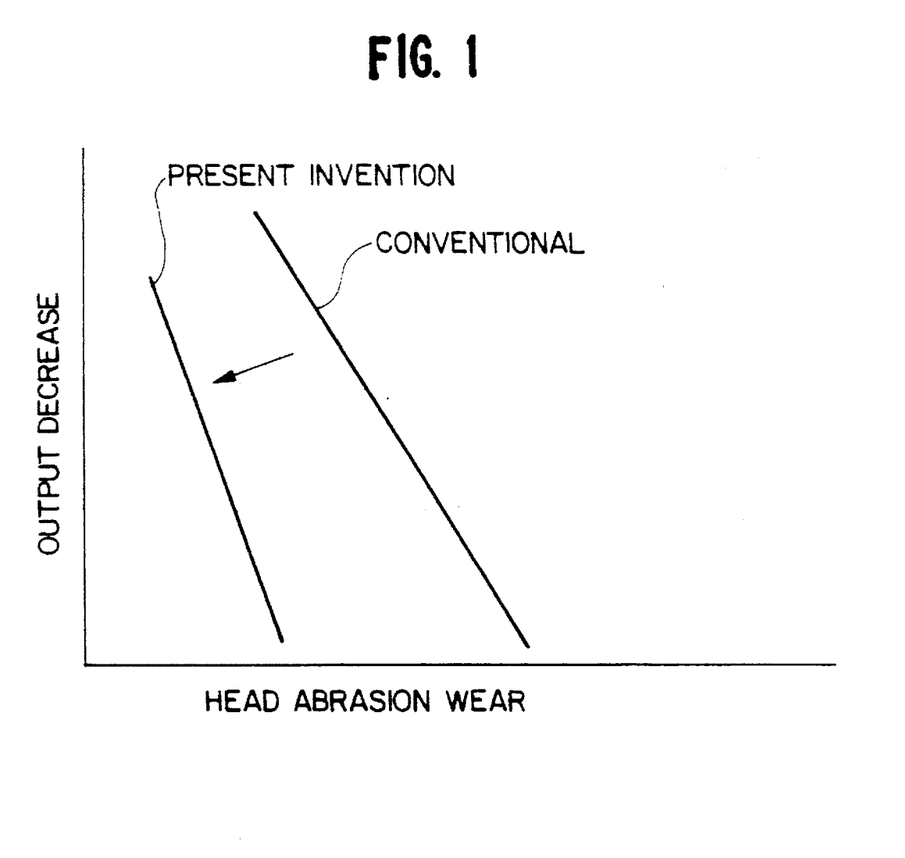
FIG. 1 illustrates head abrasion wear-output decrease correlation curves for both conventional magnetic recording media and magnetic recording media in accordance with the present invention.

Magnetic recording media in accordance with the present invention exhibit a head abrasion wear-output decrease correlation curve which is shifted in the ideal direction where both of head abrasion wear and output decrease are reduced, as shown in FIG. 1.

If the ferromagnetic metal particles do not contain Al in substantially the amount in accordance with the present invention, the magnetic layer may become so soft that it causes severe head fouling and increased output reduction.

Applicants have discovered that the balance between head abrasion wear and head fouling, which may not be satisfied by the use of Al alone, is satisfied in the present invention by treating the surfaces of the ferromagnetic metal particles with the above-described compound 1 or 2 of this invention.

While not wishing to be bound by theory, the mechanism of the effects of this invention is thought to be probably as follows.

The surfaces of ferromagnetic metal particles usually are covered with an oxide film having a thickness of about several tens of angstroms (Å) and the structure —O—Fe—OH is present on the Fe surfaces. This structure containing —O—Fe—OH is linked to the compound of this invention by a hydrogen bond or coordinate bond to thereby link the compound of this invention to atoms present on the surfaces of the ferromagnetic metal particles and thus contribute to oxidative stability. For example, the compound of this invention functions like a chelate due to the SH group and/or OH group thereof to tenaciously adhere to the surfaces of the ferromagnetic metal particles.

It is thought that the compound of this invention is bonded to the ferromagnetic metal particles based on adequately controlled interaction between the compound and the particles as described above and, at the same time, has adequately controlled interaction with a binder resin due to the chemical structure thereof to thereby improve the dispersibility of the ferromagnetic metal particles.

Further, since one or more of the substituents $R^1$, $R^2$, $R^3$, and $R^4$ present in the molecules of the compounds (Compounds 1 and 2) of this invention is an alkyl group, aryl group (i.e., aromatic group), the magnetic layer surface is thought to have improved water repellency and, hence, enhanced resistance to oxidation and corrosion under high-humidity conditions. It is also thought that since the affinity of the binder resin for the ferromagnetic metal particles in the magnetic layer is high, the magnetic layer has improved mechanical properties and, as a result, even under low-humidity conditions it is less apt to cause magnetic-head fouling, resulting in reduced output decrease and smaller output fluctuations.

It is further thought that because the ferromagnetic metal particles contain Al, the advantages described above can be maintained, yet the magnetic layer has sufficient abrading properties.

The compounds of this invention are now explained in greater detail. First, Compound 1 of this invention is explained below.

The compound represented by formula (1) can be synthesized, for example, by reacting a compound represented by $R^2$—CO—CH($R^1$)—COOH with thiourea.

In the formula (1), when $R^1$ or $R^2$ is an unsubstituted alkyl group, it has preferably 1 to 20 carbon atoms, more preferably 1 to 12 carbon atoms. Examples of the substituted alkyl group include alkyloxycarbonylalkyl groups, aryloxycarbonylalkyl groups, and N-aryl- or N-aralkylcarbamoylalkyl groups. In such a substituted alkyl group, the substituent which is substituted to a substituted alkyl group has preferably 1 to 20 carbon atoms, more preferably 1 to 12 carbon atoms.

When $R^1$ or $R^2$ is an aryl group, examples thereof include a phenyl group and a naphthyl group. The aryl group may have a substituent if desired.

Specific examples of the compound (i.e., Compound 1 represented by formula (1)) of this invention are illustrated below, but the compound is not limited thereto and other suitable compounds will be apparent to one skilled in the art.
(1) 2-mercapto-4-hydroxy-6-methylpyrimidine
(2) 2-mercapto-4-hydroxy-6-ethylpyrimidine
(3) 2-mercapto-4-hydroxy-6-propylpyrimidine
(4) 2-mercapto-4-hydroxy-6-butylpyrimidine
(5) 2-mercapto-4-hydroxy-6-pentylpyrimidine
(6) 2-mercapto-4-hydroxy-6-hexylpyrimidine
(7) 2-mercapto-4-hydroxy-6-heptylpyrimidine
(8) 2-mercapto-4-hydroxy-6-octylpyrimidine
(9) 2-mercapto-4-hydroxy-6-nonylpyrimidine
(10) 2-mercapto-4-hydroxy-6-decylpyrimidine
(11) 2-mercapto-4-hydroxy-6-undecylpyrimidine
(12) 2-mercapto-4-hydroxy-6-dodecylpyrimidine
(13) 2-mercapto-4-hydroxy-6-tridecylpyrimidine
(14) 2-mercapto-4-hydroxy-6-tetradecylpyrimidine
(15) 2-mercapto-4-hydroxy-6-pentadecylpyrimidine
(16) 2-mercapto-4-hydroxy-6-hexadecylpyrimidine
(17) 2-mercapto-4-hydroxy-6-heptadecylpyrimidine
(18) 2-mercapto-4-hydroxy-6-octadecylpyrimidine
(19) 2-mercapto-4-hydroxy-6-phenylpyrimidine
(20) 2-mercapto-4-hydroxy-6-naphthylpyrimidine
(21) 2-mercapto-4-hydroxy-5-(N-methylpiperazinylmethyl)-6-phenylpyrimidine
(22) 2-mercapto-4-hydroxy-5,6,7,8-tetrahydroquinazoline Among these, Compound (3) is particularly preferably used in the present invention.

These compounds may be substituted with one or more substituents. Examples of the substituents include substituents having Hammett's substituent constants in the range of from −0.9 to 0.8. Specific examples thereof include alkyl groups (e.g., methyl, ethyl, and t-butyl), aryl groups (e.g., phenyl), halogens (e.g., Cl and Br), amino groups (e.g., amino and dimethylamino), a hydroxyl group, alkoxy groups (e.g., methoxy), acyloyl groups (e.g., acetyl), alkoxycarbonyl groups (e.g., ethyloxycarbonyl), a cyano group, a nitro group, and halogen-substituted alkyl groups (e.g., trichloromethyl).

The ferromagnetic metal particles may contain one or more Compounds 1 of this invention.

Compound 2 of this invention will now be explained.

A 4-hydroxytetrazaindene derivative represented by formula (2) wherein $R^3$ is a —OH group can be synthesized by reacting a compound represented by $R^4$—CO—CH$_2$—COOCH$_2$CH$_3$ ($R^4$ is as defined hereinbelow) with 1H-5-amino-1,2,4-triazole.

A 6-hydroxytetrazaindene derivative represented by formula (2) wherein $R^4$ is a —OH group can be synthesized by reacting 2-hydrazino-4-hydroxypyrimidine with an orthoformic ester.

The ferromagnetic metal particles to be employed in this invention may contain one or more compounds selected from the 4-hydroxytetrazaindene derivatives and the 6-hydroxytetrazaindene derivatives.

In the formula (2), when $R^3$ or $R^4$ is an unsubstituted alkyl group, it has preferably 1 to 20 carbon atoms, more preferably 1 to 12 carbon atoms. Examples of the substituted alkyl group include alkyloxycarbonylalkyl groups, aryloxycarbonylalkyl groups, and N-aryl- or N-aralkylcarbamoylalkyl groups. In such a substituted alkyl group, the substituent which is substituted to a substituted alkyl group has preferably 1 to 20 carbon atoms, more preferably 1 to 12 carbon atoms.

When $R^3$ or $R^4$ is an aryl group (i.e., an aromatic group), examples thereof include phenyl group and naphthyl group. The aryl group may have a substituent if desired.

Specific examples of the compound (i.e., Compound 2 represented by formula (2)) of this invention are illustrated below, but the compound is not limited thereto and other suitable compounds will be apparent to one skilled in the art.
(1) 4-hydroxy-6-methyl-1,3,3a,7-tetrazaindene
(2) 4-hydroxy-6-ethyl-1,3,3a,7-tetrazaindene
(3) 4-hydroxy-6-propyl-1,3,3a,7-tetrazaindene
(4) 4-hydroxy-6-butyl-1,3,3a,7-tetrazaindene
(5) 4-hydroxy-6-pentyl-1,3,3a,7-tetrazaindene
(6) 4-hydroxy-6-hexyl-1,3,3a,7-tetrazaindene
(7) 4-hydroxy-6-heptyl-1,3,3a,7-tetrazaindene
(8) 4-hydroxy-6-octyl-1,3,3a,7-tetrazaindene
(9) 4-hydroxy-6-nonyl-1,3,3a,7-tetrazaindene
(10) 4-hydroxy-6-dodecyl-1,3,3a,7-tetrazaindene
(11) 4-hydroxy-6-undecyl-1,3,3a,7-tetrazaindene
(12) 4-hydroxy-6-tridecyl-1,3,3a,7-tetrazaindene
(13) 4-hydroxy-6-pentadecyl-1,3,3a,7-tetrazaindene
(14) 4-hydroxy-6-heptadecyl-1,3,3a,7-tetrazaindene
(15) 4-hydroxy-6-phenyl-1,3,3a,7-tetrazaindene
(16) 4-hydroxy-6-propoxycarbonylmethyl-1,3,3a,7-tetrazaindene
(17) 4-hydroxy-6-hexyloxycarbonylmethyl-1,3,3a,7-tetrazaindene
(18) 4-hydroxy-6-phenoxycarbonylmethyl-1,3,3a,7-tetrazaindene
(19) 4-hydroxy-6-(N-phenylcarbamoyl)methyl-1,3,3a,7-tetrazaindene
(20) 4-hydroxy-6-(N-benzylcarbamoyl)methyl-1,3,3a,7-tetrazaindene
(21) 4-methyl-6-hydroxy-1,3,3a,7-tetrazaindene
(22) 4-ethyl-6-hydroxy-1,3,3a,7-tetrazaindene
(23) 4-propyl-6-hydroxy-1,3,3a,7-tetrazaindene
(24) 4-butyl-6-hydroxy-1,3,3a,7-tetrazaindene
(25) 4-pentyl-6-hydroxy-1,3,3a,7-tetrazaindene
(26) 4-hexyl-6-hydroxy-1,3,3a,7-tetrazaindene
(27) 4-heptyl-6-hydroxy-1,3,3a,7-tetrazaindene
(28) 4-octyl-6-hydroxy-1,3,3a,7-tetrazaindene
(29) 4-nonyl-6-hydroxy-1,3,3a,7-tetrazaindene
(30) 4-dodecyl-6-hydroxy-1,3,3a,7-tetrazaindene
(31) 4-undecyl-6-hydroxy-1,3,3a,7-tetrazaindene
(32) 4-tridecyl-6-hydroxy-1,3,3a,7-tetrazaindene
(33) 4-pentadecyl-6-hydroxy-1,3,3a,7-tetrazaindene
(34) 4-heptadecyl-6-hydroxy-1,3,3a,7-tetrazaindene
(35) 4-phenyl-6-hydroxy-1,3,3a,7-tetrazaindene
(36) 4-propoxycarbonylmethyl-6-hydroxy-1,3,3a,7-tetrazaindene
(37) 4-hexyloxycarbonylmethyl-6-hydroxy-1,3,3a,7-tetrazaindene
(38) 4-phenoxycarbonylmethyl-6-hydroxy-1,3,3a,7-tetrazaindene
(39) 4-(N-phenylcarbamoyl)methyl-6-hydroxy-1,3,3a,7-tetrazaindene
(40) 4-(N-benzylcarbamoyl)methyl-6-hydroxy-1,3,3a,7-tetrazaindene Among these, Compound (1) is particularly preferably used in the present invention.

These compounds may be substituted with one or more substituents. Examples of the substituents include substituents having Hammett's substituent constants in the range of from −0.9 to 0.8. Specific examples thereof include alkyl groups (e.g., methyl, ethyl, and t-butyl), aryl groups (e.g., phenyl), halogens (e.g., Cl and Br), amino groups (e.g., amino and dimethylamino), a hydroxyl group, alkoxy groups (e.g., methoxy), acyloyl groups (e.g., acetyl), alkoxycarbonyl groups (e.g., ethyloxycarbonyl), a cyano group, a nitro group, and halogen-substituted alkyl groups (e.g., trichloromethyl).

In the present invention, the ferromagnetic metal particles may contain one or more Compounds 2 of this invention.

The amount of the compound (Compounds 1 and 2 represented by formulae (1) and (2)) of this invention contained on the surface of the ferromagnetic metal particles in the present invention is preferably up to 10 μmol, more preferably from 1 to 5 μmol, per $m^2$ of the surface area of the ferromagnetic metal particles.

In the present invention, for treating the surfaces of ferromagnetic metal particles with the compound of this invention to adhere the compound to the surface's to thereby cause the particles to contain the compound, any desired technique may be used without particular limitations. Examples thereof include:

(i) dissolving or dispersing the compound of this invention into a low-boiling organic solvent (e.g., methanol, ethanol, acetone, or methyl ethyl ketone), at a concentration of 0.1 to 10% by weight, adding ferromagnetic metal particles to this solution in a suitable amount, usually 5 to 30% by weight based on the amount of the solvent, and mixing the particles with the solution, followed by removal of the solvent by filtration or distillation;

(ii) grinding ferromagnetic metal particles along with the compound of this invention and adding a binder and a solvent to the resulting mixture, followed by kneading and dispersion, as disclosed in, e.g., JP-B-3-263615; and (iii) preparing a coating solution, the compound of this invention being dissolved or dispersed into part of a solvent for the coating solution, and the resulting solution or dispersion along with a binder resin and ferromagnetic metal particles is subjected to kneading and dispersion. Of the above methods, method (ii) is preferred. If desired and necessary, methods (i) to (iii) and other methods may be used in combination.

Thus, the compound of this invention can be present in the magnetic layer of the magnetic recording medium of this invention in such a state that sufficient interaction is established between the compound and the ferromagnetic metal particles. The amount of the compound present is almost the same as that used for the above-described treatment for ferromagnetic metal particles, and may be suitably selected according to purpose.

The ferromagnetic metal particles to be used in the present invention is not particularly limited as long as it contains Al in an amount of 0.5 to 6% by weight per the total weight of metal components contained in the ferromagnetic metal particles. This Al amount (% by weight) is the proportion (i.e., percentage) of the weight of Al atoms to the total weight of whole metal components (including Al) contained in the ferromagnetic metal particles (i.e., the amount (by weight) of the metal atoms contained in the ferromagnetic metal particles). In this invention, although the Al contained in the ferromagnetic metal particles is thought to be actually present usually in the form of an oxide, the Al amount is measured in terms of the weight of atomic Al, by the atomic absorption method, and then the Al amount (i.e., the proportion of Al, % by weight) is calculated.

Conventional techniques may be used to incorporate Al into ferromagnetic metal particles in accordance with the present invention. An example thereof is the following method.

Particles of, for example, $\alpha$-FeOOH or $\alpha$-Fe$_2$O$_3$ may be produced by any suitable conventional method. The particles may be dispersed into a separately prepared aqueous solution of a water-soluble aluminum salt, such as aluminum sulfate. The pH of this solution may be then adjusted to a value in the acidic region to thereby cause aluminum oxide to adhere to or deposit on the surfaces of the particles of $\alpha$-FeOOH, $\alpha$-Fe$_2$O$_3$, or the like. Subsequently, the particles of $\alpha$-FeOOH, $\alpha$-Fe$_2$O$_3$, or the like which have on the surfaces thereof aluminum oxide adhered or deposited thereon may be recovered by filtration, dried, and then reduced at an elevated temperature using a reducing gas, such as hydrogen or carbon monoxide, to thereby produce the desired particles. The aluminum content in the ferromagnetic metal particles can be easily regulated by changing the concentration of the above-described water-soluble aluminum salt in its aqueous solution.

The ferromagnetic metal particles preferably used in the present invention are particles comprising mainly a ferromagnetic metal, e.g., iron, cobalt, or nickel, or an alloy of these and containing an aluminum component (preferably as an oxide) preferably near the particle surfaces. The amount of the Al contained in the ferromagnetic metal particles is preferably from 0.5 to 6% by weight, more preferably from 1 to 5% by weight, especially preferably from 1.5 to 4% by weight, in terms of the weight of Al atom, per the total weight of metal components contained in the ferromagnetic metal particles.

Examples of such ferromagnetic metal particles containing an aluminum component include ferromagnetic metal particles which have a metal content of 75% or higher and in which 80% by weight or more of the metal component consists of at least one ferromagnetic metal or alloy thereof (e.g., Fe, Co, Ni, Fe-Co, Fe-Ni, Co-Ni, or Co-Ni-Fe) and up to 20% by weight of the metal component may be other elements (e.g., elements selected from Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc., preferably Si, P, etc.).

The ferromagnetic metal particles to be used in this invention preferably have a particle size such that the specific surface area, as measured by the BET method, is 30 to 60 $m^2/g$ and the crystallite size, as determined by X-ray diffractometry, is 100 to 300Å.

Specific surface areas substantially outside the range specified above are undesirable in that ferromagnetic metal particles with too small specific surface areas are not sufficiently suitable for high-density recording, while ferromagnetic metal particles with too large specific surface areas are also unsuitable for high,density recording because they have insufficient dispersibility and are hence unable to be provided in a magnetic layer with a smooth surface.

Suitable ferromagnetic metal particles utilized in the present invention have the following magnetic properties; a saturation magnetization of generally 110 emu/g or higher, preferably 120 emu/g or higher; a coercive force of generally 800 Oe or higher, preferably 900 Oe or higher; and an acicular ratio (average particle length/average width) of preferably 5 or higher.

Any suitable method for producing ferromagnetic metal particles may be used to produce ferromagnetic metal particles for use in this invention, and the following methods may, for example, be employed.

(1) A method in which an organic acid salt of a ferromagnetic metal, e.g., an organic acid composite salt (mainly oxalate), is reduced with a reducing gas, e.g., hydrogen.

(2) A method comprising reducing an acicular oxyhydroxide containing a ferromagnetic metal, an acicular oxyhydroxide containing a ferromagnetic metal and the other metal, or an acicular iron oxide obtained from the oxyhydroxides.

(3) A method comprising vaporizing a ferromagnetic metal in a low-pressure inert gas.

(4) A method comprising pyrolyzing a metal carbonyl compound.

(5) A method in which ferromagnetic metal particles are electrolytically precipitated using a mercury electrode and the mercury is then separated.

(6) A method in which a salt of a metal capable of forming a ferromagnetic metal is reduced in an aqueous solution thereof with a reducing substance (e.g., a boron hydride compound, a hypophosphite, or hydrazine) to obtain ferromagnetic metal particles.

Ferromagnetic metal particles produced by method (2), (3), or (6) above are easily used, with the ferromagnetic metal particles obtained by method (2) being most desirable from the standpoints of production cost and quality.

It is preferred that an oxide film be formed on the surfaces of the thus-obtained ferromagnetic metal particles in order to improve chemical stability. For example, ferromagnetic metal particles that have undergone any of the following known gradual oxidation treatments may be used in the present invention.

• A method comprising immersing the particles in an organic solvent and then drying the particles.

• A method comprising immersing the particles in an organic solvent, feeding an oxygen-containing gas thereto to form an oxide film on the particle surfaces, and then drying the particles.

• A method comprising forming an oxide film on the particle surfaces by regulating the partial pressures of oxygen gas and an inert gas, without using an organic solvent.

As the binder resin to be used in this invention, any of various kinds of conventionally known resins, including a thermoplastic resin, thermosetting resin, and reactive resin, may be employed without particular limitations. Examples of suitable binder resins include copolymers produced by the addition polymerization of, e.g., vinyl chloride, vinyl esters, (meth)acrylic esters, styrene, etc., and polymers produced by condensation polymerization, e.g., polyesters and polyurethanes.

It is preferable that the binder used in this invention contain a polar group so as to enhance the dispersibility of the ferromagnetic metal particles.

It is possible to incorporate into the binder a curable resin or a hardener in order to improve durability. Examples thereof include thermosetting resins or compounds such as polyisocyanate compounds and polyepoxy compounds and ultraviolet- or electron beam-curable resins or compounds containing an unsaturated double bond. Examples of ultraviolet- or electron beam-curable resins and a detailed explanation of processes for producing these are given in JP-A-62-256219.

Suitable thermoplastic resins for use in this invention may have a softening temperature of 150° C. or lower, an average molecular weight of 10,000 to 300,000, and a polymerization degree of about 50 to 2,000. Examples of such thermoplastic resins include polymers of (meth)acrylic acid esters, styrene, (meth)acrylonitrile, butadiene, vinyl esters, (meth)acrylamide, vinyl chloride, vinylidene chloride, or the like, polymers or copolymers of derivatives of these compounds, and copolymers of such monomers with other monomers copolymerizable therewith. Specific examples thereof include vinyl chloride-vinyl acetate copolymers, vinyl chloride copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, nylon-silicone resins, nitrocellulose-polyamide resins, poly(vinyl fluoride), vinylidene chloride-acrylonitrile copolymers, butadiene-acrylonitrile copolymers, polyamide resins, poly(vinyl butyral), cellulose derivatives (e.g., cellulose acetate butyrate, cellulose diacetate, cellulose triacetate, cellulose propionate, nitrocellulose, ethyl cellulose, methyl cellulose, propyl cellulose, methyl ethyl cellulose, carboxymethyl cellulose, and acetyl cellulose), styrene-butadiene copolymers, polyester resins, chlorovinyl ether-acrylic acid ester copolymers, amino resins, thermoplastic resins of various synthetic rubber types, and mixtures thereof.

Suitable thermosetting or reactive resins for use in this invention may have a molecular weight is 200,000 or lower in a coating solution but higher (to infinity) through condensation, addition, or other reaction which take place when the coating solution is heated after being applied and dried. Preferred thermosetting or reactive resins do not soften or melt before undergoing a thermal decomposition. Examples of such resins include phenolic resins, phenoxy resins, epoxy resins, curable polyurethane resins, urea resins, melamine resins, alkyd resins, silicone resins, reactive acrylic resins, epoxy-polyamide resins, nitrocellulose-melamine resins, mixtures of a high-molecular polyester resin and an isocyanate prepolymer, mixtures of a methacrylate copolymer and a diisocyanate prepolymer, mixtures of a polyester polyol and a polyisocyanate, urea formaldehyde resins, low-molecular weight glycol/high-molecular weight diol/triphenylmethane triisocyanate mixtures, polyamine resins, polyimine resins, and mixtures thereof.

Preferably, the thermoplastic, thermosetting, or reactive resin has, besides its characteristic functional group, any of the polar groups enumerated below. Examples of the polar groups include: acidic groups (e.g., a carboxylic acid group, a sulfinic acid group, a sulfenic acid group, a sulfonic acid group, a phosphoric acid group, a sulfuric acid group, a phosphonate group, a phosphinate group, and a boric acid group, a sulfuric acid ester group, a phosphoric acid ester group, and an alkyl ester group thereof (these acidic groups may be in the form of Na salt or the like)); groups derived from amino acids; groups derived from aminosulfonic acids and groups derived from sulfuric acid or phosphoric acid esters with amino alcohols; groups derived from amphoteric compounds (e.g., alkylbetaines); basic groups (e.g., an amino group, an imino group, an imido group, and an amido group); and other groups including epoxy groups which generate a hydroxyl group upon reaction, a hydroxyl group, an alkoxyl group, a thiol group, a halogen group, a silyl group, and a siloxane group. Usually, one to six kinds of these groups may be contained in the above resin. Especially preferred polar groups include epoxy, —OH, —COOM, —$SO_3M$, —$OSO_3M$, —$PO_3M_2$, and —$OPO_3M_2$ groups (M is H, an alkali metal (e.g., Na or K), or an ammonium ion). These polar groups can be incorporated into a resin by the copolymerization (co-condensation polymerization) of monomers containing the polar groups or by utilizing a polymolecular reaction. It is preferred that the content of the polar groups in the resin be from $1\times10^{-5}$ eq/g-resin to $1\times10^{-3}$ eq/g-resin.

Especially preferred resins containing a polar group in this invention are vinyl chloride resins and polyurethane resins. Especially preferred polar groups include epoxy, —$SO_3M$, and —OH groups.

Specific examples of the preferred resins containing a polar group include a polyurethane containing —$SO_3Na$ ("UR-8300," manufactured by Toyobo Co., Ltd., Japan), a polyester polyurethane containing —$SO_3Na$ ("VYLON 530," manufactured by Toyobo Co., Ltd.), and a vinyl chloride-vinyl acetate copolymer containing —$SO_3Na$ ("MR-110," manufactured by Nippon Zeon Co., Ltd., Japan).

These resins containing a polar group may be used alone or in combinations of two or more thereof, and may also be used in combination with an ordinary thermoplastic, thermosetting or reactive resin not containing any of the polar groups enumerated above. In this case, it is desirable that the resin containing a polar group account for generally at least 30% by weight, preferably 50 to 100% by weight, more preferably 60 to 90% by weight, of all the resins.

In the present invention, the amount of the binder resin is preferably from 8 to 25 parts by weight (more preferably 10 to 20 parts by weight) per 100 parts by weight of the ferromagnetic metal particles. Binder resin amounts substantially outside that range are undesirable in that too small binder resin amounts result in insufficient dispersibility and poor durability, while too large binder resin amounts result in reduced packing density in the magnetic layer. In the case of using a hardener, it is included, with respect to amounts, in the binder resin.

Examples of the hardener include polyisocyanate compounds including, for example, di-, tri-, and tetraisocyanates which are selected from aliphatic, aromatic, and alicyclic compounds having two or more —N=C=O groups in the molecule.

Specific examples of the polyisocyanate compounds include isocyanates such as tolylene diisocyanate, 4,4'-diphenylmethane diisocyanate, hexamethylene diisocyanate, xylylene diisocyanate, naphthylene-1,5-diisocyanate, otoluidine diisocyanate, isophorone diisocyanate, triphenylmethane triisocyanate, and isophorone diisocyanate; products of the reaction of the above-mentioned isocyanates with polyalcohols; and polyisocyanates formed through the condensation of isocyanates. These polyisocyanates are commercially available under the trade names of: Coronate L, Coronate HL, Coronate 2030, Coronate 2031, Millionate MR, and Millionate MTL (manufactured by Nippon Polyurethane Co., Ltd., Japan); Takenate D-102, Takenate D-110N, Takenate D-200, and Takenate D-202 (manufactured by Takeda Chemical Industries, Ltd., Japan); and Desmodule L, Desmodule IL, Desmodule N, and Desmodule HL (manufactured by Sumitomo Bayer Co., Ltd., Japan). These may be used alone, or used in combinations of two or more thereof, taking advantage of a difference in curing reactivity. For the purpose of accelerating the curing reaction, such a polyisocyanate may be used in combination with a compound containing a hydroxyl group (e.g., butanediol, hexanediol, a polyurethane having a molecular weight of 1,000 to 10,000, or water) or containing an amino group (e.g., monomethylamine, dimethylamine, or trimethylamine) or a catalyst comprising a metal oxide. These hydroxyl or amino compounds desirably are polyfunctional. It is preferred that these polyisocyanate compounds be used in an amount of preferably 1 to 50% by weight, more preferably 10 to 30% by weight, based on the sum of the binder resins.

Besides the ferromagnetic particles described above, the magnetic layer in this invention may further contain a lubricant, dispersant, abrasive agent, antistatic agent, etc. as additives.

Examples of the lubricant include fatty acid esters made from a monobasic fatty acid having 12 to 20 carbon atoms and a monohydric alcohol having 3 to 12 carbon atoms; silicone oils (e.g., dialkylpolysiloxanes (the alkyls each having 1 to 5 carbon atoms), dialkoxypolysiloxanes (the alkoxys each having 1 to 4 carbon atoms)), monoalkylmonoalkoxypolysiloxanes (the alkyl having 1 to 5 carbon atoms and the alkoxy having 1 to 4 carbon atoms), phenylpolysiloxane, and fluoroalkylpolysiloxanes (the alkyl having 1 to 5 carbon atoms); electrically conductive fine powders (e.g., graphite); inorganic powders (e.g., molybdenum disulfide and tungsten disulfide); fine powders of plastics (e.g., polyethylene, polypropylene, polyethylene-vinyl chloride copolymers, and polytetrafluoroethylene); α-olefin polymers; unsaturated aliphatic hydrocarbons which are liquid at ordinary temperature (compounds containing an n-olefin double bond bonded to a terminal carbon atom and having about 20 carbon atoms); and fluorocarbons. These lubricants may be present in an amount of generally 0.2 to 20 parts by weight per 100 parts by weight of the binder.

Examples of the dispersant (including wetting agent) that can be used in this invention include fatty acids having 12 to 18 carbon atoms of the formula $R_1COOH$, where $R_1$ is an alkyl or alkenyl group having 11 to 17 carbon atoms (e.g., caprylic acid, capric acid, lauric acid, myristic acid, palmitic acid, stearic acid, behenic acid, oleic acid, elaidic acid, linoleic acid, linolenic acid, and stearolic acid); metallic soaps including the above-enumerated fatty acids and an alkali metal (e.g., Li, Na, or K) or an alkaline earth metal (Mg, Ca, or Ba); fluorinated esters of the above-numerated fatty acids; amides of the above-enumerated fatty acids; alkylphosphoric esters of poly(alkylene oxide)s; lecithins; and trialkyl polyolefinoxy quaternary ammonium salts (the alkyls each having 1 to 5 carbon atoms and the olefin being, e.g., ethylene or propylene). Also usable besides these are higher alcohols having 12 or more carbon atoms, sulfuric acid esters thereof, and the like. These dispersants may be present in an amount of 0.5 to 20 parts by weight per 100 parts by weight of the binder.

Examples of the abrasive material that can be used in this invention include conventional abrasive agents, such as inorganic nonmagnetic fine powders having a Mohs' hardness of generally 5 or higher, preferably 7 or higher. Specific examples thereof include fine powders of oxides (e.g., aluminum oxides (e.g., $\alpha$-$Al_2O_3$, $\gamma$-$Al_2O_3$, molten alumina, and corundum), chromium oxide ($Cr_2O_3$), iron oxide ($\alpha$-$Fe_2O_3$), silicon dioxide, and titanium dioxide); carbides (e.g., silicon carbide and titanium carbide); nitrides (e.g., boron nitride); diamond, etc. The abrasive agents preferably have an average particle diameter of 0.05 to 1.0 µm, and may be present in an amount of generally 1 to 12 parts by weight per 100 parts by weight of the ferromagnetic particles. An abrasive agent amount of 2 to 5 parts by weight, however, is sufficient. That is, in the present invention, the amount of abrasive agent can be reduced, compared with conventional magnetic recording media and output can hence be improved. It should be noted that in conventional magnetic recording media, 2 to 20 parts by weight of an abrasive agent must generally be added in order to prevent head fouling.

Examples of the antistatic agent include electrically conductive fine powders such as carbon blacks (especially ones having an average particle diameter of 10 to 300 nm) and carbon black graft polymers; natural surfactants such as saponin; nonionic surfactants such as the alkylene oxide type, glycerol type, or glycidol type; cationic surfactants such as higher alkylamines, quaternary ammonium salts, pyridine and other heterocyclic compounds, and phosphonium or sulfonium compounds; and anionic surfactants containing an acidic radical, such as a carboxylic, sulfonic, or phosphoric acid radical or a sulfate or phosphate radical.

The electrically conductive fine powders and surfactants enumerated above may be present in amounts of 0.2 to 20 parts by weight and 0.1 to 10 parts by weight, respectively, per 100 parts by weight of the binder.

The surfactants may be present alone or as a surfactant mixture. Although those surfactants are used as antistatic agents, they may be used for other purposes, e.g., as an agent for improving dispersibility, magnetic properties, or lubricating properties or as a coating aid.

The magnetic layer of the magnetic recording medium of the present invention may be formed by immersing or dissolving the ferromagnetic metal particles, a binder, and other ingredients in a solvent, treating the mixture with a known dispersing machine to disperse the insoluble ingredients, and then coating the resulting composition on a nonmagnetic support.

Organic solvents are preferred as the solvent and may be used as a mixture thereof in any suitable proportion. Examples thereof include ketone-type solvents (e.g., acetone, methyl ethyl ketone, methyl isobutyl ketone, and cyclohexanone); alcohol-type solvents (e.g., methanol, ethanol, propanol, and butanol); ester-type solvents (e.g., methyl acetate, ethyl acetate, butyl acetate, ethyl lactate, and glycol acetate monoethyl ethers); glycol ether-type solvents (e.g., ether, glycol dimethyl ethers, glycol monoethyl ethers, and dioxane); tar-type (aromatic hydrocarbon) solvents (e.g., benzene, toluene, xylene, cresol, chlorobenzene, and styrene); chlorinated hydrocarbons (e.g., methylene chloride, ethylene chloride, carbon tetrachloride, chloroform, ethylene chlorohydrin, and dichlorobenzene); and other compounds including N,N-dimethylformaldehyde and hexane.

In preparing a magnetic coating solution comprising the above-described ferromagnetic particles, binder resin, organic solvent, additives, etc., any desired conventionally known dispersing and mixing method may be employed. For example, the ingredients for a magnetic coating solution may be separated for mixing into some parts, which are mixed together later. For kneading and dispersion, any of various kneading machines may be used. Examples thereof include a two-roll mill, three-roll mill, ball mill, pebble mill, trommel, sand grinder, Szegvari, attritor, high-speed impeller dispersing machine, high-speed stone mill, high-speed impact mill, disper, kneader, high-speed mixer, homogenizer, and ultrasonic dispersing machine.

For forming a magnetic layer on a nonmagnetic support, conventional techniques may be used. Specifically, methods described in "Coating Kogaku (Coating Technology)" (Asakura Shoten, 1971) and other books may be employed.

For applying the thus-prepared magnetic coating solution, any suitable coating device may be used. Examples of coating techniques include air doctor coating, blade coating, air knife coating, squeeze coating, impregnation coating, reverse roll coating, transfer roll coating, gravure coating, kiss coating, cast coating, spray coating, bar coating, and spin coating.

Suitable kneading and dispersing techniques which may be used in the present invention are described in T. C. Patton, "Paint Flow and Pigment Dispersion", (1975). As described therein, two or more magnetic layers may be formed by the simultaneous multi-coating method.

The nonmagnetic support to be used in this invention is not particularly limited, and any suitable support may be employed. Examples of nonmagnetic supports include films of various synthetic resins (e.g., poly(ethylene terephthalate), polyethylene, polypropylene, polycarbonates, poly(ethylene naphthalate), polyamides, poly(amide-imide)s, polyimides, polysulfones, and polyethersulfones); and metal foils (e.g., aluminum foil and stainless-steel foil). These nonmagnetic supports may have a thickness of 2.5 to 100 μm, preferably 3 to 80 μm, and may be used in the form of a tape, sheet, card, disk, drum, etc.

Conventional techniques may be used for forming a magnetic layer on the nonmagnetic support. Specifically, methods described in "Coating Kogaku (Coating Technology)" (Asakura Shoten, 1971) and other methods may be employed.

The magnetic layer thus formed on the support is subjected, if desired and necessary, to a treatment for orienting the ferromagnetic particles in the layer, before being dried and subjected to a surface treatment, e.g., calendering (pressing treatment).

If desired and necessary, heat treatment, irradiation with, e.g., electron beam, or the like may be conducted as a treatment for curing. The resulting structure is cut into a desired shape. Thus, the magnetic recording medium of this invention is produced.

The thickness of the magnetic layer is not particularly limited, but is preferably 0.5 to 6 μm, more preferably 2 to 4 μm. In the case where the magnetic layer is made to have a multilayer structure, e.g., one having two or more magnetic layers superposed on one another, the additional layer may be as thin as 0.2 to 1 μm. This thickness on a dry basis depends on the use and shape of the magnetic recording medium, standards therefor, etc. The magnetic recording medium of this invention may have a magnetic layer on each side of the nonmagnetic support. Further, it may have an intermediate layer between the nonmagnetic support and the magnetic layer, and also have a backing layer comprising nonmagnetic particles and a resin on the side opposite to the magnetic layer. Conventional techniques may be employed for forming these layers.

The present invention will be explained below in detail by reference to the following Examples, but the invention is not construed as being limited thereto. Hereinafter, all parts are by weight.

EXAMPLE 1

| Formulation for Magnetic Coating Solution | |
|---|---|
| Ferromagnetic metal particle<br>Composition (weight proportion<br>in terms of atoms)<br>Fe/Co/Ni/Al/Si = 90.5/4/2/2.1/1.4<br>Hc: 1,750 Oe<br>Specific surface area by BET<br>method: 56 m$^2$/g<br>Particle size (length in the long<br>axis): 0.18 μm<br>Acicular ratio: 9<br>σs: 126 emu/g | 100 parts |
| Compound 1 of this invention<br>Compound (3): 2-Mercapto-4-hydroxy-<br>6-propylpyrimidine<br>Amount used for surface treatment<br>of the ferromagnetic metal powder<br>per unit surface area: 3.0 μmol/m$^2$ | 3.2 parts |
| Vinyl chloride resin<br>SO$_3$Na: 1 × 10$^{-4}$ eq/g<br>Degree of polymerization: 300 | 12 parts |
| Polyester polyurethane resin<br>Neopentyl glycol/caprolactonepolyol/<br>MDI = 0.9/2.6/1<br>SO$_3$Na: 1 × 10$^{-4}$ eq/g | 5 parts |
| α-Alumina<br>(average particle diameter: 0.2 μm) | 10 parts |
| Carbon black<br>(average particle diameter: 0.03 μm) | 0.5 part |
| Methyl ethyl ketone | 100 parts |
| Cyclohexanone | 100 parts |

Production of Magnetic Recording Medium

The ferromagnetic metal powder specified above was mixed and ground with Compound 1 of this invention. The binders and the solvents were added to the ground mixture, and the resulting mixture was kneaded. The additives including the abrasive agent were then added and dispersed thereinto with a sand mill. To the thus-obtained dispersion was added 50 parts of an MEK solution containing dissolved therein 5 parts of a polyisocyanate, 2 parts of stearic acid, and 2 parts of butyl stearate. This mixture was subjected to dispersing treatment by high-speed shearing and then filtered through a filter having an average opening diameter of 1 μm to prepare a coating solution.

The coating solution obtained was coated on a 10 μm thick poly(ethylene terephthalate) support at a dry thickness of 3.5 μm, and the coating solution still in a wet state was subjected to orientation with a cobalt magnet having a magnetic force of 3,000 G and a solenoid having a magnetic force of 1,500 G, subsequently dried, and then treated with a calender comprising metal rolls. The resulting structure (i.e., web) was slit into an 8-mm width to produce an 8-mm video tape.

EXAMPLE 2

An 8-mm video tape was produced in the same manner as in Example 1, except that the amount of Compound 1 of this invention was changed to 1.6 parts (0.5 times the amount of Compound 1 used in Example 1 in terms of amount per unit surface area of the ferromagnetic metal powder (i.e., 1.5 μmol/m$^2$)).

EXAMPLE 3

An 8-mm video tape was produced in the same manner as in Example 1, except that the amount of Compound 1 of this invention was changed to 9.6 parts (3 times the amount of Compound 1 used in Example 1 in terms of amount per unit surface area of the ferromagnetic metal powder (i.e., 9.0 μmol/m$^2$)).

EXAMPLE 4

An 8-mm video tape was produced in the same manner as in Example 1, except that Compound 2 of this invention (4-hydroxy-6-methyl-1,3,3a,7-tetrazaindene=Compound (1) illustrated above for Compound 2 of this invention) was used in place of the Compound 1 of this invention in an amount of 2.9 parts (the same amount in terms of amount per unit surface area of the ferromagnetic metal powder (i.e., 3.0 μmol/m$^2$)).

EXAMPLE 5

An 8-mm video tape was produced in the same manner as in Example 1, except that a ferromagnetic metal powder having a composition that included Fe/Co/Ni/Al/Si in a weight proportion in terms of the atoms of 85.5/6/4/3.5/1 (specific surface area: 58 m$^2$/g; Hc: 1,660 Oe; σs: 124 emu/g) was used in place of the ferromagnetic metal powder used in Example 1.

EXAMPLE 6

An 8-mm video tape was produced in the same manner as in Example 1, except that a ferromagnetic metal powder having a composition that included Fe/Co/Ni/Al/Si in a weight proportion in terms of the atoms of 94.3/0/0/5.7/0 (specific surface area: 58 m$^2$/g; Hc: 1,610 Oe; σs: 124 emu/g) was used in place of the ferromagnetic metal powder used in Example 1.

Comparative Example 1

An 8-mm video tape was produced in the same manner as in Example 1, except that an amino group-containing silane coupling agent (TSL8331) was used in place of the Compound 1 of this invention in an amount of 4.2 parts (the same amount in terms of amount per unit surface area of the ferromagnetic metal powder (i.e., 3.0 μmol/m$^2$)).

Comparative Example 2

An 8-mm video tape was produced in the same manner as in Example 1, except that phenylphosphonic acid (PPA) was used in place of the Compound 1 of this invention in an amount of 3 parts (the same amount in terms of amount per unit surface area of the ferromagnetic metal powder (i.e., 3.0 μmol/m$^2$)).

Comparative Example 3

An 8-mm video tape was produced in the same manner as in Example 1, except that the Compound 1 of this invention was omitted.

Comparative Example 4

An 8-mm video tape was produced in the same manner as in Example 5, except that phenylphosphonic acid (PPA) was used in place of the Compound 1 of this invention used in Example 5 in an amount of 3 parts (the same amount in terms of amount per unit surface area of the ferromagnetic metal powder (i.e., 3.0 μmol/m$^2$)).

Comparative Example 5

An 8-mm video tape was produced in the same manner as in Example 5, except that the Compound 1 of this invention was omitted.

Comparative Example 6

An 8-mm video tape was produced in the same manner as in Example 6, except that phenylphosphonic acid (PPA) was used in place of the Compound 1 of this invention in an amount of 3 parts (the same amount in terms of amount per unit surface area of the ferromagnetic metal powder (i.e., 3.0 μmol/m$^2$)).

Comparative Example 7

An 8-mm video tape was produced in the same manner as in Example 6, except that the Compound 1 of this invention was omitted.

The samples obtained in accordance with the Examples and Comparative Examples were evaluated in the following manner and the results are summarized in the below Tables 1 and 2.

Abrading Property of Magnetic Layer

Head Abrasion Wear

Using a EVO-9500 deck (manufactured by Sony Corp.), a 120-minute long tape was repeatedly run 10 times in an atmosphere having a temperature of 5° C. and a relative humidity of 80%. The change in projected head amount (i.e., amount of protrusions) resulting from the running was measured with an optical microscope ("HISOMET", manufactured by Union Co., Ltd.).

Steel Ball-Abrading Property of Magnetic Layer

A ¼ inch steel ball was run on a magnetic layer over a distance of 400 mm (i.e., 20 mm for 20 times) in an atmosphere having a temperature of 23° C. and a relative humidity of 10%, while a load of 30 g was applied to the steel ball. The volume of the steel ball which had been abraded by contact with the magnetic layer (abrasion wear) was measured.

Head Fouling

Output Decrease

Using a V900 deck (manufactured by Sony Corp.), a 120-minute long tape was repeatedly subjected to reproduction 10 times in an atmosphere having a temperature of 23° C. and a relative humidity of 10%. The ratio of the RF output in the 10th reproduction to that in the 1st reproduction (10th/1st) was determined.

Adhesion of Magnetic Layer to Glass

A ¼ inch glass ball was moved forward and backward 10 times on a magnetic layer over a distance of 20 mm in an atmosphere having a temperature of 23° C. and a relative humidity of 10%, while a load of 30 g was applied to the glass ball. The proportion of the area where magnetic layer debris adhered to the surface to the whole glass ball surface abraded by contact with the magnetic layer was determined. The evaluation was based on the following criteria.
None . . . No magnetic layer debris adherent to the glass ball surface.
Small . . . The proportion of the area where magnetic layer debris adhered to the surface to the area of the whole abraded glass ball surface is ⅕ or smaller.
Medium . . . The proportion mentioned above is from ⅕ to ½.
Large . . . The proportion mentioned above is ½ or larger.

Oxidative Stability

Weatherability of Magnetic Layer

A sample was allowed to stand for 1 week in an atmosphere having a temperature of 60° C. and a relative humidity of 90% to examine changes of magnetic properties. Using a vibration-test magnetometer (manufactured by Toei Kogyo K.K.), the coercive force (Hc), saturated magnetic flux density (Bm), and residual magnetic flux density (Br) of the magnetic layer were determined at a magnetic-filed intensity (Hm) of 5 kOe. The proportion (%) of the difference between the initial value and the after-standing value (AHc, ABm) were determined.

Dispersibility

Hc, Bm

Measurement was conducted with a vibration-test magnetometer (manufactured by Toei Kogyo K.K.) at an Hm of 5 kOe.

Center Line Average Surface Roughness

Measurement was made with a three-dimensional surface roughness meter (manufactured by Kosaka Kenkyu-sho) at a cutoff value of 0.25 mm.

Electromagnetic Characteristic

"7-MHz Output"

Using 8-mm video deck ("FUJIX8", manufactured by Fuji Photo Film Co., Ltd.), 7 MHz signals were recorded. The recorded 7 MHz signals were reproduced and their output was measured with an oscilloscope. As a reference, 8-mm tape SAG P6-120 (manufactured by Fuji Photo Film Co., Ltd.) was used.

The results of the foregoing evaluations are shown in Table 2 below.

TABLE 1

| | Ferromagnetic Metal Particle | | | | Amount used for |
|---|---|---|---|---|---|
| | $Hc$ (Oe) | $\sigma s$ (emu/g) | Al content (wt %) | Compound of This Invention, etc. | surface treatment ($\mu mol/m^2$) |
| Ex. 1 | 1750 | 126 | 2.1 | Compound 1 of this invention: Compound | 3.0 |
| Ex. 2 | 1750 | 126 | 2.1 | (3), (2-mercapto-4-hydroxy-6-propyl- | 1.5 |
| Ex. 3 | 1750 | 126 | 2.1 | pyrimidine) | 9.0 |
| Ex. 4 | 1750 | 126 | 2.1 | Compound 2 of this invention: Compound (1) | 3.0 |
| Comp. Ex. 1 | 1750 | 126 | 2.1 | silane coupling agent (TSL8331) | 3.0 |
| Comp. Ex. 2 | 1750 | 126 | 2.1 | PPA | 3.0 |
| Comp. Ex. 3 | 1750 | 126 | 2.1 | none | 0 |
| Ex. 5 | 1660 | 124 | 3.5 | Compound 1 of this invention: Compound (3) | 3.0 |
| Comp. Ex. 4 | 1660 | 124 | 3.5 | PPA | 3.0 |
| Comp. Ex. 5 | 1660 | 124 | 3.5 | none | 0 |
| Ex. 6 | 1610 | 124 | 5.7 | Compound 1 of this invention; Compound (3) | 3.0 |
| Comp. Ex. 6 | 1610 | 124 | 5.7 | PPA | 3.0 |

TABLE 1-continued

| | Ferromagnetic Metal Particle | | | | Amount used for surface treatment ($\mu mol/m^2$) |
|---|---|---|---|---|---|
| | Hc (Oe) | σs (emu/g) | Al content (wt %) | Compound of This Invention, etc. | |
| Comp. Ex. 7 | 1610 | 124 | 5.7 | none | 0 |

TABLE 2

| | Dispersibility | | | | Oxidative Stability | | | | Head-Abrading Property | | |
|---|---|---|---|---|---|---|---|---|---|---|---|
| | 7 MHz | | | | (Demagnetization) | | Head Fouling | | Head abrasion | | |
| | output (dB) | Hc (Oe) | Bm (Oe) | Ra (nm) | ΔHc (%) | ΔBm (%) | Output decrease | Adhesion to glass | wear (μ) | Steel ball-abrading property* | |
| Ex. 1 | 4.0 | 1751 | 3270 | 3.4 | 0.8 | 6 | 0.8 | None | 4.0 | $0.63 \times 10^{-6}$ | |
| Ex. 2 | 3.8 | 1740 | 3200 | 3.5 | 0.85 | 6.4 | 1.2 | None | 4.0 | $0.63 \times 10^{-6}$ | |
| Ex. 3 | 3.2 | 1740 | 3120 | 4.5 | 0.8 | 5 | 1.4 | None | 4.6 | $0.58 \times 10^{-6}$ | |
| Ex. 4 | 4.0 | 1750 | 3200 | 3.6 | 1.0 | 7 | 1.2 | None | 4.2 | $0.62 \times 10^{-6}$ | |
| Comp. Ex. 1 | 3.0 | 1740 | 3100 | 4.2 | 0.7 | 6 | 2.2 | Small | 5.0 | $0.55 \times 10^{-6}$ | |
| Comp. Ex. 2 | 4.0 | 1740 | 3220 | 3.6 | 0.5 | 5 | 3.0 | Large | 3.8 | $0.65 \times 10^{-6}$ | |
| Comp. Ex. 3 | 3.8 | 1720 | 3270 | 3.5 | 1.5 | 8 | 4.6 | Large | 4.2 | $0.60 \times 10^{-6}$ | |
| Ex. 5 | 4.2 | 1640 | 3450 | 4.2 | 0.5 | 6 | 0.4 | None | 6.6 | $0.93 \times 10^{-6}$ | |
| Comp. Ex. 4 | 4.4 | 1650 | 3500 | 4.0 | 0.5 | 6 | 1.8 | Medium | 6.4 | $0.95 \times 10^{-6}$ | |
| Comp. Ex. 5 | 3.4 | 1630 | 3570 | 5.0 | 1.2 | 9 | 3.2 | Large | 7.0 | $0.90 \times 10^{-6}$ | |
| Ex. 6 | 3.2 | 1630 | 3200 | 4.7 | 0.4 | 5 | 0.2 | None | 10.2 | $1.25 \times 10^{-6}$ | |
| Comp. Ex. 6 | 3.3 | 1630 | 3250 | 4.7 | 0.4 | 5 | 1.2 | Small | 10.0 | $1.25 \times 10^{-6}$ | |
| Comp. Ex. 7 | 3.2 | 1610 | 3300 | 5.5 | 1.1 | 8 | 2.0 | Medium | 10.4 | $1.20 \times 10^{-6}$ | |

*: abrasion wear ($mm^3$)

Figure 2:
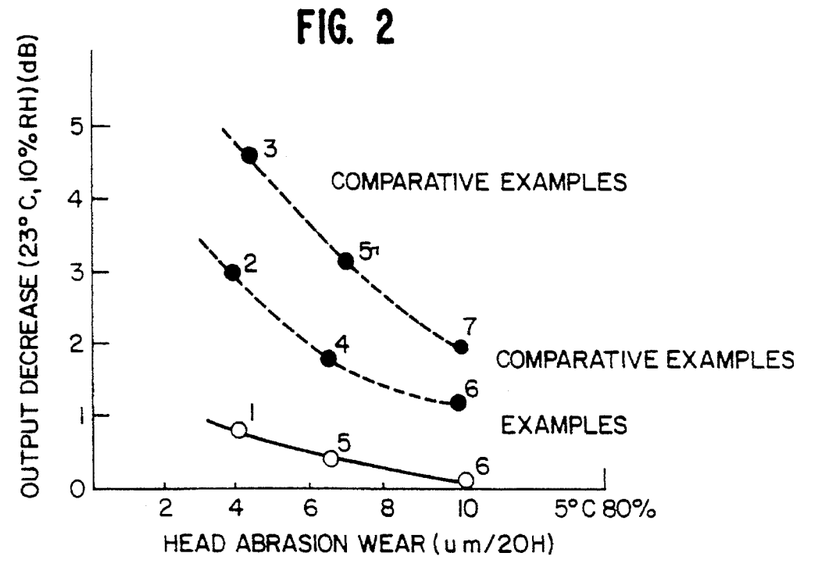
FIG. 2 is a graph of head abrasion wear versus output decrease of magnetic recording media in accordance with the Examples and Comparative Examples.
Figure 3:
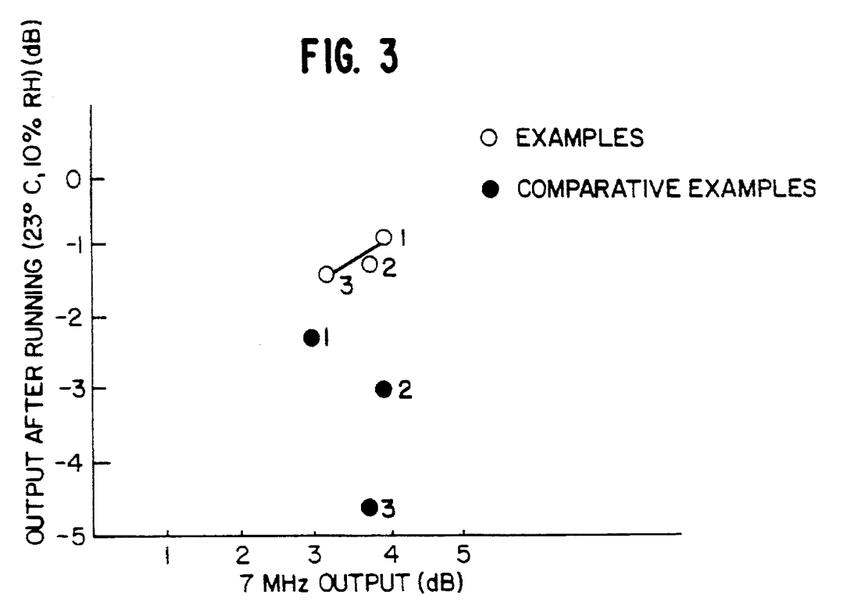
FIG. 3 is a graph of 7 MHz output versus output after running of magnetic recording media in accordance with the Examples and Comparative Examples.

As is apparent from the results of Tables 1 and 2, the samples obtained in the Examples which were in accordance with this invention did not exhibit adhesion of magnetic layer debris to glass and had reduced output decrease, yet they exhibited almost the same head abrasion wear as that of the samples obtained in the Comparative Examples (see FIGS. 2 and 3). That is, the results show that when ferromagnetic metal powders having the same composition containing an amount of Al in accordance with the present invention are employed, head fouling can be prevented by use of the compound of this invention and, hence, output decrease can be diminished effectively.

According to the present invention, a magnetic recording medium, which even under low-humidity conditions, has reduced head abrasion wear and head fouling and, hence, reduced output decrease, can be provided by employing ferromagnetic metal particles containing an amount of Al in accordance with the present invention and by treating the surfaces of the ferromagnetic metal particles with a pyrimidine or tetrazaindene derivative having a structure as set forth above to cause the particles to contain the derivative.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising a nonmagnetic support and a magnetic layer provided thereon, said magnetic layer comprising mainly ferromagnetic metal particles and a binder resin, said ferromagnetic metal particles containing Al in an amount of from 0.5 to 6% by weight per the total weight of metal components contained in the ferromagnetic metal particles and further containing on the surfaces thereof at least one compound selected from the group consisting of: a compound represented by the following formula (1):

(1)

wherein $R^1$ and $R^2$ each represents H or an alkyl or aryl group, provided that at least one of $R^1$ and $R^2$ is an alkyl or aryl group; and a compound represented by the following formula (2):

(2)

wherein $R^3$ and $R^4$ each represents an —OH group, an alkyl or aryl group, provided that at least one of $R^3$ and $R^4$ is an alkyl or aryl group.

2. The magnetic recording medium as claimed in claim 1, wherein said compound represented by formula (1) and/or (2) is contained in an amount of up to 10 μmol/m$^2$ of surface area of said ferromagnetic metal particles.

3. The magnetic recording medium as claimed in claim 1, wherein said at least one compound is selected from the group consisting of compounds represented by the formula (1) of claim 1.

4. The magnetic recording medium as claimed in claim 1, wherein said at least one compound is selected from the group consisting of compounds represented by the formula (2) of claim 1.

* * * * *